April 21, 1959 H. B. CHATFIELD 2,882,767
PROCESS AND APPARATUS FOR FORMING METAL SHEETS INTO TUBES
Filed Aug. 24, 1954 2 Sheets-Sheet 1
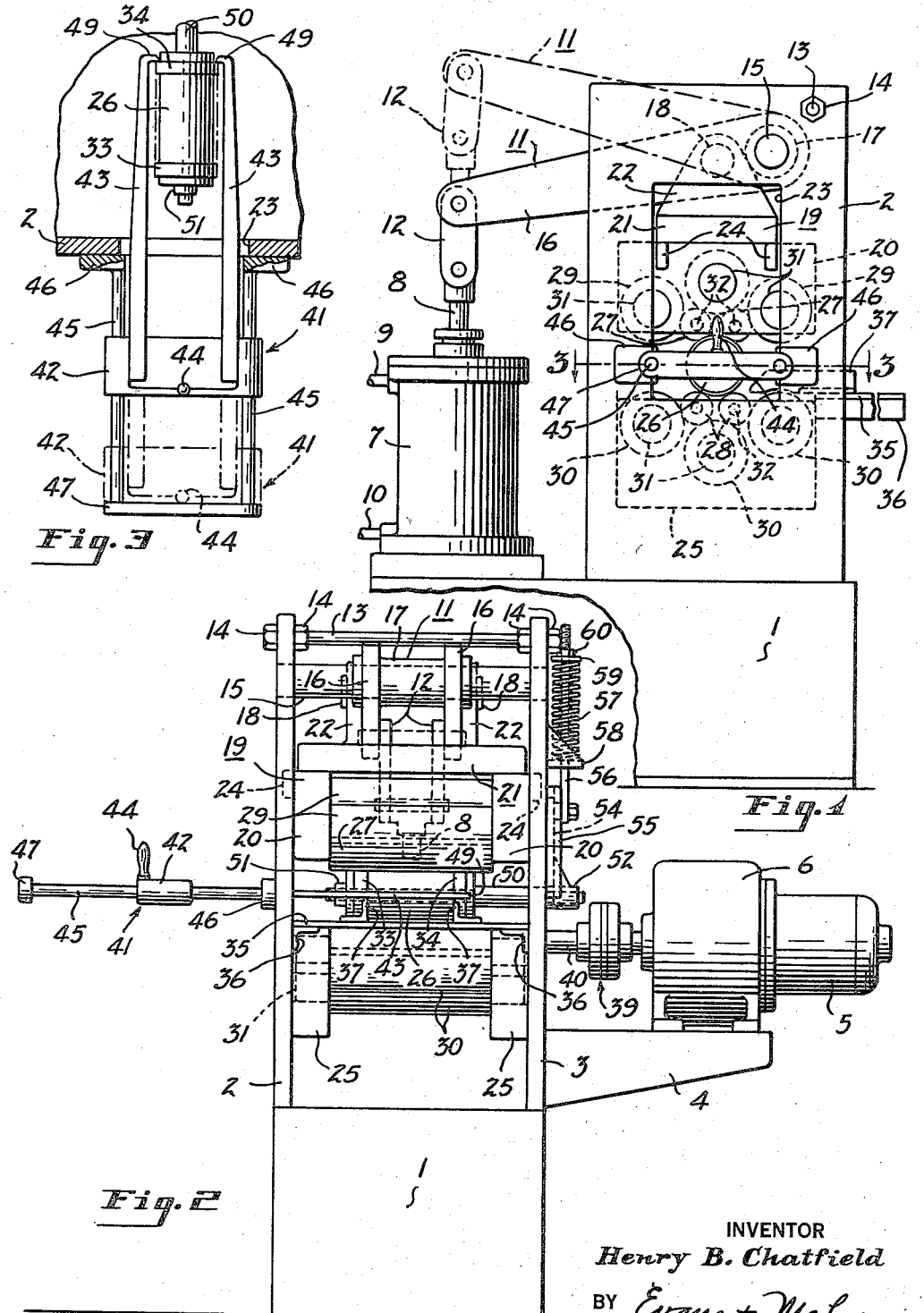
INVENTOR
Henry B. Chatfield
BY Evans + McCoy
ATTORNEYS April 21, 1959      H. B. CHATFIELD      2,882,767
PROCESS AND APPARATUS FOR FORMING METAL SHEETS INTO TUBES
Filed Aug. 24, 1954      2 Sheets-Sheet 2
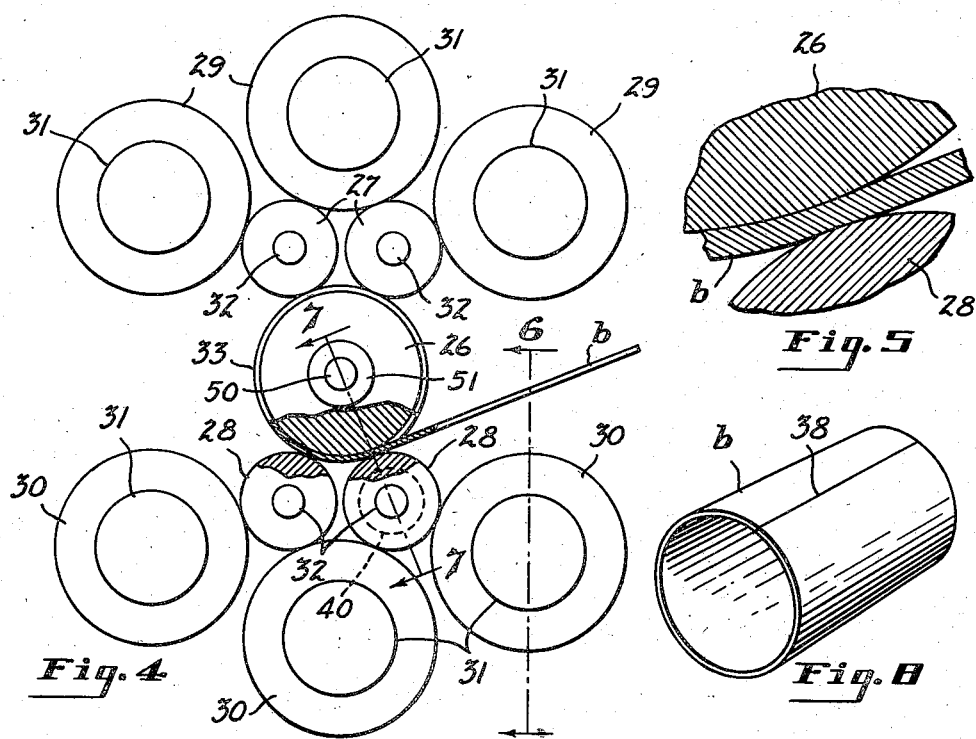
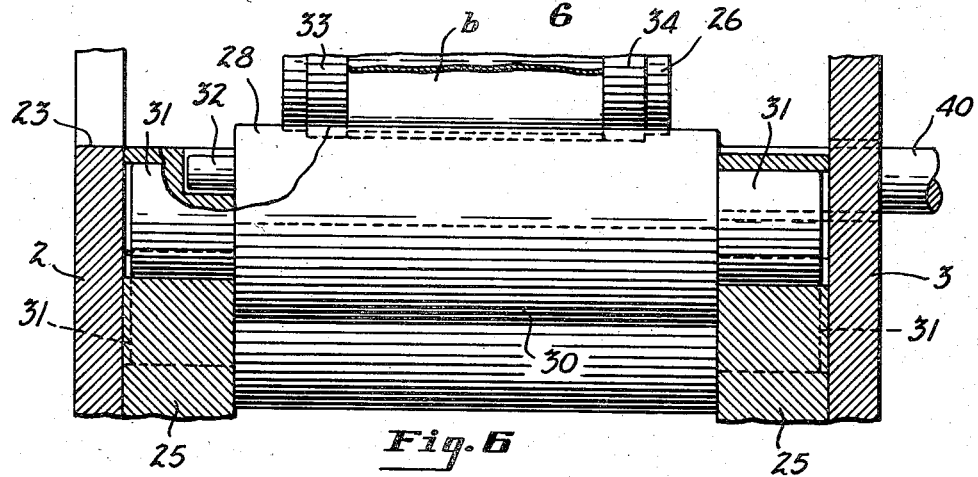
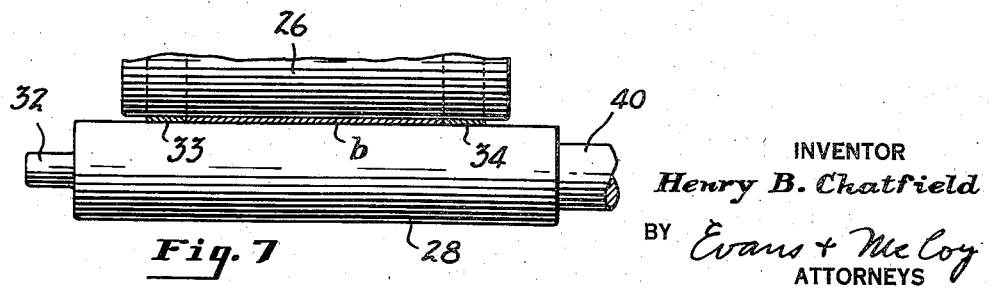
INVENTOR
Henry B. Chatfield
BY Evans + McCoy
ATTORNEYS United States Patent Office 2,882,767
Patented Apr. 21, 1959

2,882,767

PROCESS AND APPARATUS FOR FORMING METAL SHEETS INTO TUBES

Henry B. Chatfield, Kinsman, Ohio

Application August 24, 1954, Serial No. 451,813

4 Claims. (Cl. 80—23)

The present invention relates to the forming of tubes from sheet metal and more particularly to a means for and a method of cold rolling sheet metal to form tubes which retain their circular cross section after the original forming operation.

According to the method of the present invention, a sheet metal blank is passed between a mandrel and one or more pressure rolls and is caused to conform to the shape of the mandrel, a high pressure being applied to said rolls to cold work the sheet metal as it is being formed into a tube and to reduce the thickness of the sheet.

The length of the blank and its thickness are preselected so that its opposite ends are in engagement and form a tight seam in the finished tube.

Since there is a minimum area of contact between the blank and the pressure rolls and a maximum area of contact between the blank and the mandrel, the outer portion of the blank in contact with the pressure roll may be cold worked and elongated while the inner portion is substantially unworked. The pressure rolls are preferably of a small diameter less than that of the mandrel and may be pressed toward the mandrel by suitable backing rolls of larger diameter. Sufficient force may be applied to the pressure rolls to reduce the thickness of the metal sheet and to elongate the radially outer portion thereof so that circumferential compressive stresses are present in said outer portion when the tube is removed from the mandrel. The cold working of one side of the metal sheet removes the tensile stresses in the outer portion of the tube caused by bending the sheet.

Heretofore, where sheets were bent or curled to form a cylindrical tube with a longitudinal seam, it was found after completion of the forming operations that the edges of the sheet separate at the seam due to the tensile stresses caused by elongation of the outer surface of the sheet. As a result the tubes were out of round and could not easily be welded at the seam to form a truly cylindrical tube.

According to the present invention a cylindrical sheet metal tube is formed with the edges forming the seam in engagement, and the thickness of the sheet metal is reduced on a mandrel by cold rolling to cause metal flow so as to avoid the creation of stresses tending to separate said edges. As a result the edges remain in engagement after removal of the tube from the mandrel and the tube retains the desired shape. It is preferable to cold work the metal sheet sufficiently to create circumferential compressive stresses in the radially outer portion of the tube and circumferential tensile stresses in the radially inner portion thereof so that force is required to separate the engaging edges forming the seam. The stresses holding the edges together facilitate welding the edges together without distorting the shape of the tube, and the heat employed during welding will tend to anneal the metal and to relieve such stresses.

The original length and thickness of each sheet metal blank is preselected so that the tube formed therefrom has the desired diameter and radial thickness when the edges forming the seam are in engagement. In order to control the reduction of thickness of the metal sheet, it is preferable to provide means for limiting movement of each pressure roll toward the mandrel whereby a minimum spacing is maintained therebetween equal to the desired thickness of the finished tube. As herein shown such limiting means comprises one or more hard metal sleeves or bands forming raised portions on the mandrel and having a uniform thickness equal to said desired thickness. If desired such sleeves may be mounted for axial sliding movement on the mandrel and may be employed to remove a finished tube from the mandrel.

An object of the invention is to provide a simple and economical apparatus for accurately producing sheet metal tubes from flat blanks.

A further object of the invention is to provide an improved method of making tubes with tight seams.

A still further object of the invention is to provide a method of making tubes with a high degree of accuracy.

Another object of the invention is to provide an improved method of and apparatus for cold rolling homogeneous metal sheets into tubes.

Other objects, uses, and advantages of the present invention will become apparent from the following description and from the drawings in which:

Figure 1 is a fragmentary side elevational view showing on a reduced scale a machine constructed according to the present invention, the uppermost portion of the power actuating mechanism being shown in dotted lines;

Figure 2 is a front elevational view of the machine shown in Fig. 1 and on the same scale;

Figure 3 is a fragmentary horizontal sectional view taken substantially on the line indicated at 3—3 in Fig. 1 and on a larger scale, the outermost position of the tube ejecting fingers being shown in dotted lines;

Figure 4 is a vertical sectional view of the machine shown in Figs. 1 to 3 with parts omitted and with parts broken away and shown in section;

Figure 5 is a fragmentary view similar to Fig. 4 but on a larger scale;

Figure 6 is a fragmentary sectional view taken substantially on the line indicated at 6—6 in Fig. 4 and on a larger scale, parts being added and parts being broken away and shown in section;

Figure 7 is a fragmentary view taken substantially on the line indicated at 7—7 in Fig. 4 and on the same scale as Fig. 6, the spacing sleeves and the sheet metal blank between said sleeves and between the pressure roll and the mandrel being shown in section and the roll and mandrel not being sectioned; and Figure 8 is a perspective view of a cylindrical tube made in the machine of Figs. 1 to 7.

Referring more particularly to the drawings wherein like parts are identified with the same numerals throughout the several views, Figs. 1 to 7 show one form of machine which may be used to perform the method of the present invention, it being understood that substantially different machines may be employed to perform the basic steps of the method.

As herein shown, the apparatus employed for forming sheet metal into tubes includes a base 1 having a pair of upright rectangular frame members 2 and 3 for supporting the forming and rolling mechanism and a projecting bracket 4 carried by the frame member 3 for supporting a driving mechanism including an electric motor 5 and a speed reducer 6.

Supported in upright position on the base 1 next to the frame members 2 and 3 is a reciprocating piston fluid motor or ram 7 having a vertical piston rod 8. Motive fluid, preferably hydraulic, is supplied to the cylinder on one side of the piston and is exhausted from the other side thereof through conduits 9 and 10.

Any suitable force multiplying mechanism may be provided to obtain the mechanical advantage needed for the rolling operation. As herein shown, a main lever or beam 11 is pivotally supported at one end by the frame members 2 and 3 and is connected to the piston rod 8 by means of a pair of parallel links 12 each of which is pivoted at both ends whereby the lever 11 is actuated by the fluid motor 7 from an uppermost position shown in dotted lines in Fig. 1 to the lower position shown in solid lines in that figure.

The upper ends of the frame members 2 and 3 are rigidly connected and held in spaced relationship by a rod 13. The opposite ends of the rod extend through circular openings in the frame members and are threaded on both sides of each opening to receive nuts 14 which hold the rod in fixed position.

Alined circular openings are provided in the frame members near the rod 13 for receiving a horizontal shaft 15 which supports the end of the lever 11 and serves as a fulcrum or pivot therefor, the rod 13 reinforcing the portion of the frame members 2 and 3 supporting said shaft.

The lever 11 comprises two spaced parallel arm portions 16 and a round boss portion 17 connecting said arm portions and journaled on the shaft 15 centrally thereof. The arm portions are provided with horizontally alined circular openings for receiving a pivot pin or shaft 18 whose ends project through the openings and serve to support a roll carriage or frame 19. The carriage comprises a pair of upright rectangular bearing blocks 20 slidably engaging the frame members 2 and 3, a horizontal rectangular portion 21 integral with said bearing blocks, and a pair of upwardly projecting ears 22 integral with said horizontal portion and pivotally connected to the lever 11. The ears are located on opposite sides of the lever and are provided at their upper ends with alined circular openings of a size to receive the pivot pin 18.

The frame members engage the bearing blocks 20 to guide the carriage 19 vertically as it is raised and lowered and are provided with rectangular slots or openings 23 each having opposite vertical edges serving the same purpose. Each of the bearing blocks has a pair of lugs 24 adjacent the vertical edges of one of said openings and projecting into that opening for guiding the carriage vertically as it is raised and lowered.

A pair of upright stationary rectangular bearing blocks 25 similar to the movable blocks 20 are rigidly connected to the frame members 2 and 3 directly below said movable blocks. As herein shown the movable and stationary blocks are of substantially the same horizontal length and thickness and are carried flatwise against the frame members 2 and 3 so as to support a plurality of rolls of the same axial length while preventing substantial axial movement thereof.

According to the method of the present invention a substantially flat homogeneous sheet metal blank of a predetermined size is held in engagement with a mandrel of circular cross section and is guided in a path concentric to said mandrel so that it will conform thereto while simultaneously the portion of the sheet out of contact with the mandrel is worked so as to reduce its thickness and increase the length of its outer surface. The sheet is preferably cold worked with one or more pressure rolls while it is being guided around the mandrel, and the forming operation is preferably completed in one revolution of the mandrel. The sheet may be reduced in thickness sufficiently so that the edges of the sheet are in engagement to form a tight seam as shown in Fig. 8 and said edges are held in engagement by compressive stresses acting in the circumferential direction.

As herein shown, the method of the present invention is performed by employing an externally cylindrical mandrel 26, upper and lower pairs of externally cylindrical pressure rolls 27 and 28 spaced circumferentially around the mandrel, and upper and lower trios of externally cylindrical backing rolls 29 and 30 engaging the pressure rolls. Suitable means may be provided in addition to the pressure rolls to hold the metal sheet against the mandrel to cause its shape to conform to that of the mandrel, but as herein shown this function is performed solely by the pressure rolls without the assistance of auxiliary guiding means.

As herein shown, the upper rolls 29 and the lower rolls 30 are of the same size and shape and are mounted in a similar manner, each roll having a cylindrical journal 31 projecting a short distance beyond each end of the roll and having a diameter less than that of the roll as shown in Fig. 6. The movable bearing blocks 20 and the stationary blocks 25 are each provided with three pairs of horizontally alined cylindrical bores receiving the journals 31 and providing bearings for the backing rolls capable of withstanding the high pressures required for the cold rolling process. The backing rolls 29 and 30 are so supported by the bearing blocks 20 and 25 that they will assume a position parallel to the pivot shaft 15 when the pressure rollers are pressed against a metal sheet on the mandrel 26.

The backing rolls may be spaced circumferentally around the mandrel in any suitable manner but are preferably arranged so that each pressure roll engages and is pressed toward the mandrel by two backing rolls. Each pair of pressure rolls preferably has horizontally alined axes spaced equal distances from a vertical plane passing through the axis of the pivot pin 18 when the lever 11 is in the lower position during the cold rolling of a tube.

As herein shown, the three backing rolls 29 are equally spaced and the three rolls 30 are similarly spaced so that the outer backing rolls of each trio are alined horizontally, each upper backing roll is alined vertically with a lower backing roll, the center backing roll of each trio has its axis located in a vertical plane passing through the axis of the pivot pin 18, and the axes of each pair of pressure rolls are alined horizontally with each other and vertically with those of another pair and are spaced equal distances from said vertical plane whereby the mandrel 26 has its axis in said plane.

The pressure rolls 27 and 28 may be provided at their outer ends with cylindrical locating pins or journals 32 which project into suitable openings in the bearing blocks to prevent substantial movement of said rolls relative to the backing rolls when the upper rolls are moved upwardly away from the mandrel. However, unlike a journal 31, each pin 32 preferably has a loose fit in a bearing block as shown, for example, in Fig. 6. Since each of the pressure rolls and backing rolls has an axial length substantially equal to the distance between the parallel inner faces of the bearing blocks, axial movement thereof is prevented by said blocks.

The mandrel 26 and the pressure rolls 27 and 28 are automatically forced into the desired positions parallel to the backing rolls, and the upper backing rolls automatically assume positions parallel to the lower backing rolls when the motor 7 is actuated to cause cold rolling of a metal sheet on the mandrel. Since the rolling apparatus is self-alining, it is unnecessary for the lugs 24 or the bearing blocks 20 to guide the roll carriage 19 with great accuracy and the pressure rolls and the mandrel need not be located accurately by means of shaft or journal bearings.

In order to regulate the thickness of the sheet metal tube being formed without closely regulating the pressure applied by the motor 7, adjustable means may be provided to limit movement of the pressure rolls toward the mandrel so as to provide a minimum spacing therebetween equal to the desired thickness of the tube. By adjusting such limiting means, the thickness of the tube and the percentage reduction in thickness of the sheet metal blank may be predetermined and the initial length of the blank may be determined so that the edges of the finished tube remain in engagement and form a tight seal.

Annular raised portions or bands may be provided on the pressure rolls or on the mandrel which serve as spacing means to limit movement of the rolls toward the mandrel. Such raised portions are preferably removable or in the form of sleeves of a predetermined radial thickness which may be removed and replaced with sleeves of different thicknesses depending upon the desired thickness of the sheet metal tube.

As herein shown, the mandrel 26 is externally cylindrical and slidably receives two cylindrical metal sleeves 33 and 34 having an internal diameter substantially equal to the external diameter of the mandrel and having a uniform radial thickness equal to that of the tube being formed. The sleeves are spaced apart axially a distance at least equal to the axial length of the tube being formed so that the sheet metal blank may pass between ends of the sleeves and between the mandrel and the pressure rolls. The axial spacing of the sleeves is preferably substantially equal to the axial length of the tube so that the sleeves guide the sheet metal being rolled and prevent misalinement thereof. If desired suitable means may be provided to prevent axial movement of the sleeves away from each other or to maintain a predetermined spacing between the sleeves.

Suitable guides may be provided on the stationary frame of the machine for directing metal sheets of a given width between the sleeves 33 and 34. As herein shown, a feed table comprising a flat horizontal plate 35 is rigidly secured at its opposite ends to the frame members 2 and 3 by means of angle irons 36. A pair of parallel angle irons or guides 37 are rigidly secured to the top of the feed table with their opposed vertical faces perpendicular to the axis of the mandrel 26 and spaced apart a distance substantially equal to and slightly greater than the width of the metal sheet to be rolled. As herein shown the top of the feed table 35 is substantially in horizontal alinement with the top of the pressure rolls 28 and the vertical faces of the guides 37 extend over one of the backing rolls 30 to positions adjacent one of the pressure rolls 28 and adjacent the mandrel whereby a sheet metal blank may readily be fed to the mandrel.

As best shown in Figs. 4 to 7, a rectangular homogeneous sheet metal blank *b* having a uniform thickness slightly greater than the radial thickness of the sleeves 33 and 34 is passed between the pressure rolls and the mandrel and is caused to conform to the shape of the mandrel while being cold worked by said rolls whereby a cylindrical tube is formed having straight edges which engage each other to form a tight seam 38 as shown in Fig. 8. The tube shown herein is in the form of a right circular cylinder with the portions of the end edges of the tube adjacent each end of the seam 38 accurately alined.

While the pressure between the pressure rolls and the mandrel may be reduced just before a blank *b* is fed to the mandrel, the apparatus shown herein permits the application of a high pressure between the rolls and the mandrel and pressing of the pressure rolls against the sleeves 33 and 34 before the blank engages the mandrel. The sleeves space the pressure rolls a sufficient distance from the mandrel so that the leading edge of the blank *b* may be gripped as it is pushed toward the bight of the mandrel and the pressure roll nearest the feed plate 35.

The mandrel and the pressure and backing rolls may be rotated in any suitable manner but it is preferable to cause rotation of all the rolls by driving one of the pressure rolls. Best results are obtained by driving the pressure roll first engaged by the blank as in the apparatus illustrated herein. The pressure roll 28 nearest the guides 37 is connected to the driving shaft of the speed reducer 6 by means of a flexible coupling 39 and a shaft extension 40 integral with said roll and extending through a small opening formed in the frame member 3 and the bearing block 25.

After the forming of a tube is completed and the thickness of the tube is reduced to that of the sleeves 33 and 34, the pressure on the top of the piston of the fluid motor 7 is reduced and the lever 11 is elevated to the position shown in dotted lines in Fig. 1. The mandrel 26 may then be raised above the rolls 28 sufficiently to permit sliding the sleeves 33 and 34 and the completed tube axially off the end of the mandrel.

Means may be provided for sliding the sleeves axially off and on the mandrel manually or automatically. As herein shown, ejecting means are provided to remove the sleeves and the finished tube from the mandrel, and the sleeves are manually placed on the mandrel before the next blank is fed to the mandrel. The ejecting means includes an ejector carriage 41 mounted on the frame member 2 for reciprocation horizontally between the positions shown in solid and in dotted lines, respectively, in Fig. 3.

The ejector carriage comprises an elongated block 42 which is recessed to receive a pair of parallel horizontal ejector fingers 43 and is rigidly connected to said fingers and an upright handle 44 integral with said block projecting upwardly from the top thereof.

The block 42 is provided with small cylindrical bores at both ends thereof of a size to receive a pair of horizontal cantilever guide rods 45 parallel to the axis of the mandrel 26 whereby the ejector carriage slides horizontally in a direction parallel to said axis. The fingers 43 of the ejector carriage are spaced equal distances from the mandrel axis and are preferably located substantially in the horizontal plane passing through said axis and on opposite sides of the mandrel.

The guide rods are welded to and rigidly supported in horizontal position by a pair of flat plates 46 welded to the frame member 2 and are welded to and joined at their free ends by a bar 47.

The carriage 41 slides on the guide rods 45 to the extent permitted by the plates 46 and the bar 47 with the fingers 43 supported in cantilever fashion between said plates. The opening 23 in the frame member 2 between the plates 46 receives the ejector fingers and permits removal of the finished tube through the side of the machine.

The free ends of the fingers 43 are provided with inturned hook portions 49 which are spaced apart a distance greater than the diameter of the mandrel 26 and less than the diameter of the sleeve 34. The hook portions are located equal distances from the axis of the mandrel and at one end of the mandrel adjacent the outer vertical face of the sleeve 34 so as to engage said sleeve and to slide the same axially when the ejector carriage is moved axially away from the mandrel.

As herein shown the arms 43 and their hook portions 49 are located substantially midway between the upper and lower rolls and are normally out of contact with the rolls and mandrel so that they do not interfere with the feeding of a blank *b* to the mandrel or with the cold rolling of said blank on the mandrel.

It is preferable to move the mandrel 26 vertically away from the lower rolls 28 and 30 automatically after the completion of a tube and before removal of the tube from the mandrel so as to facilitate axial sliding of the tube and the sleeves 33 and 34. As herein shown, the mandrel 26 is mounted for rotation on a cantilever shaft 50 which is mounted on the frame member 3 for vertical movement. The shaft is threaded at its free end to receive a collar 51 which prevents movement of the mandrel off of the shaft. The opposite end of the shaft is rigidly connected to a boss 52 which prevents movement of the shaft towards the frame member 2. The portion of the shaft between the mandrel and the frame member 3 is enlarged to prevent axial movement of the mandrel.

The boss 52 is integrally connected to a flat rectangular plate 54 that slidably engages the flat vertical surface of the frame member 3. The plate is held against the frame member and guided vertically in ways provided by a pair of vertical guides 55 which prevent tilting of the shaft 50.

Any suitable manual or automatic means may be provided to move the shaft 50 and the mandrel carried thereby vertically toward and away from the pressure rolls 28. As herein shown, an adjustable biasing means is provided to move the boss 52, the plate 54, and the shaft 50 carried thereby. The biasing means includes a vertical rod 56 and a compression spring 57. The rod is rigidly connected at its lower end to the plate 54 by means of bolts or the like and projects upwardly through a circular opening in a horizontal lug 58 rigidly connected to the frame member 3 above the guides 55 and engaging the bottom of the spring 57. An annular disc or collar engages the top of the spring to prevent upward movement thereof and is held against upward movement by a nut 60. The upper portion of the rod 56 is threaded for a substantial distance vertically to receive the nut 60 whereby the compression of the spring 57 may be adjusted substantially.

After the completion of a tube on the mandrel 26 the upper rolls 27 and 29 are raised out of engagement with the tube and the spring 57, which had been compressed due to the initial lowering of said rolls, causes the mandrel to move a short distance vertically away from the lower rolls 28 and 30. This distance may be adjusted by rotating the nut 60 so that the fingers 43 will engage the sleeve and eject the tube from the mandrel when the carriage 41 is moved by pulling on the handle 44. The distance between the rolls 28 and the mandrel 26 when the upper rolls are raised may be adjusted to less than about ¼ inch if desired since this is sufficient to facilitate removal of the tube from the mandrel.

It will be apparent from Fig. 5 of the drawings that the pressure rolls cold work the metal sheet more than the mandrel 26 and cause the sheet to conform to the shape of the mandrel. Where the sheet is held against the mandrel so that there is a maximum area of contact between the sheet and the mandrel, there is a minimum amount of metal flow adjacent the mandrel and substantially all of the cold working takes place in the radially outer portion of the sheet engaging the pressure rolls. While the pressure rolls may be of any desired size, they are preferably of less diameter than the mandrel and many times the thickness of the blank b. As herein shown, the pressure rolls 27 and 28 are of the same diameter which is less than ⅔ the diameter of the mandrel 26, and the backing rolls 29 and 30 are of the same diameter which is greater than the diameter of the mandrel.

As in conventional rolling mills, the backing rolls are preferably much larger than the pressure rolls and have journals of larger diameter capable of withstanding the high forces required for cold rolling. It will be understood that the rolls 27 to 30 are made of hardened metal as in the conventional rolling mill so they will not be deformed during rolling. The sleeves 33 and 34 are made of similar hard metal so they will not decrease in radial thickness and may be used over and over again. The blanks b are made of a metal softer than that of the rolls, the mandrel, and the sleeves and are preferably a homogeneous sheet steel or the like suitable for rolling.

Where the apparatus of the present invention is employed to make tubes with diameters up to about four to five inches and with radial thicknesses up to about ⅛ to 3/16 inch, it preferably has a capacity of at least about 30 tons. The apparatus is designed somewhat like a high pressure hydraulic or pneumatic press so as to obtain such a high force with a relatively small motor, the lever 11 providing the necessary mechanical advantage.

The machine is preferably capable of applying sufficient force to reduce the thickness of the blank b to that of the sleeves 33 and 34 during a single revolution of the mandrel 26. Such force is insufficient to reduce the thickness of the sleeves but would be capable of reducing the thickness of the blank to less than the thickness of the sleeves in the absence of said sleeves.

The length and thickness of the sheet metal blank b is preselected in accordance with the diameter and thickness of the tube being formed so that a tight seam will be formed at 38. The metal sheet is preferably reduced in thickness sufficiently so that the ends thereof forming the seam are in engagement and the radially outer portion of the resulting tube is under compression after the tube is removed from the mandrel.

Since the circumference of the exterior cylindrical surface of the tube is greater than the circumference of the interior surface by an amount equal to $2\pi$ times the radial thickness of the tube, it is apparent that the radially outer portion of the metal sheet may be elongated substantially without creating undue circumferential stresses in the tube. If desired the sheet may be elongated so that both the radially innermost and radially outermost edges of the tube engage at the seam 38. However, less elongation is sufficient to remove all the circumferential tensile stresses in the radially outermost portion of the tube since much of the circumferential stress is relieved as the metal is bent and stretched beyond its elastic limit.

The radially outer portion of a tube formed according to the method of the present invention may be under circumferential compression even though the volume of sheet metal in the split tube is less than it would be if the tube were circumferentially continuous. Therefore, it is practically impossible to find a simple formula for calculating with accuracy the minimum percentage reduction in thickness required to remove tensile stresses from the radially outer portion of a tube formed according to the method of this invention. Generally it may be said, however, that such minimum percentage reduction in thickness is approximately directly proportional to the thickness of the tube and inversely proportional to its diameter.

Examples of blank sizes for given tube sizes are given below to facilitate an understanding of the invention. The blanks are cut to length from metal sheets of uniform width in a conventional manner.

Where a cylindrical tube is to be made with an inside diameter of 4.014 inches and an outside diameter of 4.385 inches, a rectangular homogeneous sheet metal blank is employed having a uniform length of 13.125 inches and a uniform thickness of 0.187 inch. The thickness of the metal sheet is reduced about 0.0015 inch by cold rolling or less than 1 percent, but this reduction is sufficient to remove undesirable circumferential tensile stresses so that the edges of the sheet remain in engagement at the seam after the tube is removed from the mandrel. Good results are obtained with such a blank size where a mild steel is employed and the thickness is reduced from about 0.0012 to 0.005 inch, and satisfactory results may be obtained where extremely high pressures are used and the thickness is reduced up to about 0.007 inch.

Reductions in thickness from about 0.0015 to 0.007 are also satisfactory where the outside diameter of the tube is about 3½ to 5 inches and the thickness is about ⅛ to 3/16 inch.

Where a cylindrical tube is to be made having an outside diameter of 3.640 inches and an inside diameter of 3.400 inches, excellent results may be obtained using a blank with a length of 11.015 inches and a thickness of 0.123 to 0.124 inch. Variations of one thousandth of an inch or so in the length or thickness of the blanks are usually permissible.

For high production at low cost, a reduction in thickness of about 0.0012 to 0.003 is usually preferable where the blank has a thickness of around ⅛ or 3/16 inch and the tube to be formed has a diameter of about 3 to 5 inches.

Since the tubes formed according to the present invention have tight seams and retain the desired shape after being removed from the mandrel, they may easily be welded at the seams without distorting their shape. The heat employed during welding tends to relieve any circumferential compressive stresses caused by cold rolling. If desired the seams may be brazed or soldered by immersing the tubes in a heated liquid with weld metal as copper or the like at or in the immediate vicinity of the abutting edges forming the seam so that the weld metal runs into the voids at the seam to fill the same and weld the joint whereby the tubes are annealed during welding and all circumferential stresses are removed.

It will be understood that, in accordance with the patent statutes, variations of the specific device disclosed may be made without departing from the spirit of the invention as defined in the appended claims.

Having described my invention, I claim:

1. A method of cold forming a homogeneous metal sheet of uniform thickness into a cylindrical tube of circular cross section having a predetermined uniform radial thickness less than the thickness of said sheet and abutting edges held in engagement by circumferential stresses, said method comprising the steps of passing the sheet between an externally cylindrical mandrel and at least one cylindrical pressure roll having a diameter less than two-thirds the diameter of the mandrel, driving said pressure roll to cause feeding of said sheet and rotation of said mandrel while holding spaced portions of the radially inner surface of the metal sheet against the cylindrical outer surface of the mandrel to conform the sheet to the mandrel and to obtain a minimum area of contact between said pressure roll and said sheet and a maximum area of contact between said mandrel and said sheet, simultaneously pressing said roll against said sheet with a force greater than that required to reduce the thickness of the tube of said predetermined thickness to cold work and elongate circumferentially the radially outer portion of said sheet nearest the radially outer surface of said sheet relative to the radially inner portion of the sheet nearest the radially inner surface of the sheet, the compressing force applied to the sheet being sufficient to reduce the thickness of the sheet to said predetermined thickness during a single revolution of the mandrel, regulating the thickness of the tube wall by limiting the movement of said pressure roll toward said mandrel and maintaining a minimum distance between the roll and the mandrel corresponding substantially to the desired radial wall thickness of said tube, the thickness of the tube wall being reduced sufficiently to move the edges of the sheet into engagement and to create circumferential compressive stresses in said radially outer portion of said tube and circumferential tensile stresses in said radially inner portion of the tube which stresses hold the side edges of the tube in engagement and cause the tube to retain its cylindrical shape.

2. A method as defined in claim 1 wherein the regulation of the wall thickness of the tube and the limiting of the movement of the roll toward the mandrel is accomplished by placing a hard metal sleeve on the mandrel having a uniform radial thickness corresponding to said predetermined thickness, said sleeve being sufficiently hard to resist compression under said first-named force.

3. A method as defined in claim 2 wherein a second pressure roll having a diameter less than two-thirds the diameter of said mandrel is pressed against the sheet to cold work the radially outer portion of the sheet.

4. An apparatus for cold forming a generally rectangular metal sheet of uniform thickness into a tube of circular cross section having a uniform radial thickness less than the thickness of said sheet and abutting edges normally held in engagement by circumferential stresses, said apparatus comprising an externally cylindrical mandrel having an external diameter substantially equal to the internal diameter of said tube, means for guiding said sheet and for causing said sheet to conform to said mandrel and to engage the outer surface of the mandrel substantially throughout its circumference including a series of pressure rolls with diameters less than that of said mandrel mounted for rotation about an axis parallel to that of said mandrel, means for causing relative rotation between said sheet and said pressure rolls and for pressing said rolls toward said mandrel to reduce the thickness of said sheet and to elongate the radially outer portion of said sheet sufficiently to remove all tensile stresses therefrom, to bring the edges of the tube into engagement, and to create circumferential tensile stresses in the radially inner portion of said sheet tending to hold said edges in engagement, said last-named means including a series of cylindrical backing rolls spaced from and parallel to said mandrel for engaging said pressure rolls to resist movement of the pressure rolls away from said mandrel and fluid pressure motor means for moving the backing rolls and the pressure rolls toward said mandrel, said mandrel and said rolls being mounted for relative movement between a pressing position in engagement with the tube and a released position wherein the tube may be removed from the mandrel, means for limiting movement of said pressure rolls toward said mandrel to provide a minimum spacing therebetween substantially equal to the thickness of said tube, said last-named means including a hard metal sleeve at each end of said mandrel having a uniform radial thickness substantially equal to the desired thickness of said tube and having an internal cylindrical surface with a diameter substantially equal to the external diameter of said mandrel, said sleeves being spaced apart a distance slightly greater than the length of said tube, said sleeves being mounted for axial sliding movement on said mandrel so that one sleeve may be slid off the end of said mandrel, means for positioning the rolls and the mandrel in said released position after the forming and cold working of said tube is completed, and means for sliding said one sleeve and the completed tube axially off the end of said mandrel while the parts are in said released position including ejector fingers for engaging the other sleeve to push the same toward said last-named end of the mandrel.

References Cited in the file of this patent

UNITED STATES PATENTS

| | | |
|---|---|---|
| 9,278 | Prosser | Sept. 21, 1852 |
| 689,008 | La Voo | Dec. 17, 1901 |
| 751,861 | La Voo | Feb. 9, 1904 |
| 761,792 | Such et al. | June 7, 1904 |
| 1,387,199 | Small | Aug. 9, 1921 |
| 1,715,219 | Biggert | May 28, 1929 |
| 1,837,523 | Braden | Dec. 22, 1931 |
| 1,919,686 | Damerall | July 25, 1933 |
| 1,931,162 | Kranz et al. | Oct. 17, 1933 |
| 1,978,235 | Summers | Oct. 23, 1934 |
| 2,043,665 | Iversen | June 9, 1936 |
| 2,256,520 | Johansen et al. | Sept. 23, 1941 |
| 2,302,163 | Anderson | Nov. 17, 1942 |
| 2,587,975 | Darner | Mar. 4, 1952 |

FOREIGN PATENTS

| | | |
|---|---|---|
| 123,197 | Great Britain | Feb. 20, 1919 |